United States Patent
Keoshkerian et al.

[11] Patent Number: 6,156,858
[45] Date of Patent: Dec. 5, 2000

[54] STABLE FREE RADICAL POLYMERIZATION PROCESSES

[75] Inventors: Barkev Keoshkerian, Thornhill; Michael K. Georges, Guelph; Peter M. Kazmaier, Mississauga, all of Canada

[73] Assignee: Xerox Corporation, Stamford, Conn.

[21] Appl. No.: 08/882,376

[22] Filed: Jun. 25, 1997

[51] Int. Cl.$^7$ ..................................................... C08F 2/38
[52] U.S. Cl. .................. 526/204; 526/219.6; 526/220; 526/327; 526/346; 526/347; 430/137
[58] Field of Search ..................... 526/220, 204; 430/137

[56] References Cited

U.S. PATENT DOCUMENTS

| | | | |
|---|---|---|---|
| 2,801,992 | 8/1957 | Hutchinson . | |
| 4,581,429 | 4/1986 | Solomon et al. | 526/220 |
| 4,804,610 | 2/1989 | Mori | 430/137 |
| 5,322,912 | 6/1994 | Georges | 526/204 |
| 5,401,804 | 3/1995 | Georges et al. | 525/267 |
| 5,412,047 | 5/1995 | Georges et al. | 526/204 |
| 5,427,885 | 6/1995 | Ota | 430/137 |
| 5,449,724 | 9/1995 | Moffat et al. | 526/204 |
| 5,476,745 | 12/1995 | Nakamura | 430/137 |
| 5,498,679 | 3/1996 | Moffat et al. | 526/204 |
| 5,530,079 | 6/1996 | Veregin et al. | 526/219.3 |
| 5,545,504 | 8/1996 | Keoshkerian et al. | 430/137 |
| 5,549,998 | 8/1996 | Georges et al. | 430/109 |
| 5,552,502 | 9/1996 | Odell et al. | 526/234 |
| 5,635,325 | 6/1997 | Inaba | 430/106 |
| 5,741,618 | 4/1998 | Shigemori | 430/137 |

FOREIGN PATENT DOCUMENTS 478838  3/1976  U.S.S.R. .

OTHER PUBLICATIONS

A.V. Trubnikov et al., "Effect of Stable Radicals on Styrene Polymerization", Saratov N.G. Chernyshevsky State University, Submitted Jul. 2, 1974.

A.V. Trubnikov et al., "Inhibition of Polymerization of Vinyl Monomers Using Nitride and Iminoxide Radicals", High––Molecular Compounds, vol. (A)XX, No. 22, 1978.

M.D. Goldfein et al., "Inhibition of Styrene Polymerization by Stable Radical 4,4'–diethoxydiphenylnitroxide", Saratov N.G. Chernyshevsky State University, Submitted Jun. 27, 1972.

M.D. Goldfein et al., "Effect of Free Stable Radicals on the Kinetics and Mechanism of Polymerization of Certain Vinyl Monomers", Saratov N.G. Chernyshevsky State University, Submitted Jan. 1, 1974.

A.V. Trubnikov et al., "Mechanism of Inhibition of Polymerization of Vinyl Monomers by Stable Radicals", Saratov N.G. Chernyshevsky State University, Submitted Jul. 7, 1975.

*Primary Examiner*—Fred Zitomer
*Attorney, Agent, or Firm*—E. O. Palazzo

[57] ABSTRACT

A process for the preparation of polymer comprising heating a mixture comprised of a free radical initiator, a stable free radical agent, a base selected from the group consisting of inorganic bases and organic bases, and at least one polymerizable monomer compound and optionally cooling, followed by optionally isolating the polymer product.

26 Claims, No Drawings

STABLE FREE RADICAL POLYMERIZATION PROCESSES

APPLICATIONS AND PATENTS

Illustrated in U.S. Pat. No. 5,412,047, the disclosure of which is totally incorporated herein by reference, is a polymerization process for the preparation of homopolymeric acrylates containing thermoplastic resin or resins comprising heating at, for example, from about 100° C. to about 160° C., a mixture comprised of a free radical initiator, an oxo nitroxide stable free radical agent, at least one polymerizable acrylate monomer compound, and optionally a solvent, to form a homopolymeric acrylate containing thermoplastic resin or resins with a high monomer to polymer conversion and a narrow polydispersity.

Illustrated in copending application U.S. Ser. No. 08/348,021, the disclosure of which is totally incorporated herein by reference, is a free radical polymerization process for the preparation of thermoplastic resin comprising heating a mixture of a free radical initiator, a stable free radical agent, and at least one polymerizable monomer compound, and wherein said heating is accomplished at a temperature of from about 40° C. to about 100° C. in the presence of ultrasonic irradiation; cooling said mixture; and optionally isolating said thermoplastic resin, and washing and drying said thermoplastic resin.

Illustrated in U.S. Pat. No. 5,728,747, the disclosure of which is totally incorporated herein by reference, is a free radical polymerization process for the preparation of a thermoplastic resin or resins comprising heating a mixture of a free radical initiator, a stable free radical agent, and at least one polymerizable monomer compound to form said thermoplastic resin or resins with a high monomer to polymer conversion; cooling said mixture; optionally isolating said thermoplastic resin or resins; and optionally washing and drying said thermoplastic resin or resins.

Illustrated in copending application U.S. Ser. No. 08/784,633, the disclosure of which is totally incorporated herein by reference, is a free radical polymerization process for the preparation of a polymer comprising heating a mixture of a free radical initiator, a stable free radical agent, a transition metal, and at least one polymerizable monomer; cooling said mixture; and optionally isolating said polymer.

Also of interest are commonly owned and assigned copending applications and patents U.S. Ser. No. 08/181,134, now U.S. Pat. No. 5,401,804; U.S. Ser. No. 08/037,192, Pat. No. 5,852,140 continuation-in-part of U.S. Ser. No. 07/976,604, now U.S. Pat. No. 5,322,912, U.S. Ser. No. 08/214,518; U.S. Ser. No. 08/223,418, U.S. Pat. Nos. 5,552,502; 5,549,998; 5,545,504; 5,530,079; 5,498,679; 5,449,724 and 5,412,047, the disclosures of each of which are totally incorporated herein by reference. Some of these patents, such as the 5,322,912 patent, illustrate stable free radical polymerization processes.

BACKGROUND OF THE INVENTION

The present invention relates to processes for the preparation of polymers, including homopolymers, random copolymers, block copolymers, functionally activated polymers, and the like, and more specifically, to a polymerization process and to the polymers, or resins formed thereby, and especially to processes for the preparation of multiblock, such as copolymers of styrene acrylates. In embodiments, the present invention relates to stable free radical processes for generating a thermoplastic polymer resin or resins, with narrow polydispersities, that is narrow molecular weight distributions as indicated by the ratio $M_w/M_n$, where $M_w$ is the weight average molecular weight and $M_n$ is the number average molecular weight, and easily controllable modality, from at least one, and for example from 1 to about 10, comprising heating for an effective period of time a mixture of a free radical initiator, a stable free radical agent, and at least one polymerizable monomer compound, for example, wherein at least one is from 1 to about 5, and preferably one, in the presence of a base like an alkali metal base, such as cesium hydroxide, under conditions that all polymer chain formations are initiated at about the same time; cooling the mixture to effectively terminate the polymerization; isolating the thermoplastic resin product; and optionally washing and drying the polymer resin product. The polymer generated by the process of the present invention in embodiments are essentially monomodal and in embodiments by repeating the heating, there is provided a method for obtaining mixtures of monomodal polymer resins that are compositionally the same resin type having characteristics of both narrow polydispersity and known or selectable modality. In embodiments, the process of the present invention provides a method for conducting bulk or neat free radical polymerization processes on multikilogram or larger scales. The aforementioned embodiments may be accomplished in a one or single pot reactor environment. Further, in embodiments polymeric chain growth proceeds by a pseudoliving mechanism and can provide thermoplastic resins of variable molecular weights from very low to very high, for example less than about 2,000 up to about 400,000, or greater, preferably about 200,000, while maintaining narrow molecular weight distributions or polydispersities of, for example, about 1.05 to about 1.95 and wherein the monomer to polymer conversion is high, for example at least about 50 percent, and more specifically, from about 50 to about 99 to 100 percent. Moreover, in embodiments block copolymers can be synthesized by the aforementioned stable free radical moderated free radical polymerization processes, wherein each block formed is, for example, well defined in length by the reacted monomer, and wherein each block formed possesses a narrow molecular weight distribution, and wherein the block copolymer is substantially 100 percent block copolymer and not contaminated with the formation of a homopolymer of the second monomer.

With the present invention in embodiments thereof there are provided stable free radical polymerization processes wherein inhibition of the thermal polymerization of monomers like styrene is minimized with a base, and wherein high $M_w$ polymers, such as from about 100,000 to about 250,000, are obtainable, and wherein in embodiments the autopolymerization of monomers, such as styrene, can be minimized or reduced in the presence of bases.

The polymer, resins, and the like obtainable with the processes of the present invention can be selected as toner polymers, as thermoplastic films, and as coatings.

PRIOR ART

One method to prepare polymers or copolymers having a narrow molecular weight distribution or polydispersity is by anionic processes. The use and availability of resins having narrow polydispersities in industrial applications is limited primarily since anionic polymerization processes are performed in the absence of atmospheric oxygen and moisture, require difficult to handle and hazardous initiator reagents, and consequently, such polymerization processes are generally limited to small batch reactors. In addition, the monomers and solvents that are used must be of high purity and anhydrous rendering the anionic process more costly than alternatives which do not have these requirements. It is, therefore, desirable to provide a free radical polymerization process that would provide narrow molecular weight distribution resins without the disadvantages of the aforementioned anionic polymerization processes, and to provide stable free radical processes wherein thermal polymerization is inhibited to minimize, or avoid undesirable side reactions and undesirable broadened molecular weight dispersity.

Otsu et. al., in *Makromol Chem., Rapid Commun.*, 3, 127 (1982), discloses the use of iniferters as a means of producing block copolymers by a free radical polymerization process. A mechanism proposed for the reaction suggested that a pseudoliving propagating free radical chain exists and that it continues to grow with time. There are two primary major drawbacks associated with using iniferters. Iniferters tend to react very slowly and the percent conversion or degree of polymerization of monomer to polymer is low, for example about 40 percent even after 20 hours of reaction time; and the free radical trap that caps the end of the growing chain has the ability to initiate new chains at any time during the course of the reaction, see for example S. R. Turner, R. W. Blevins, in *Polymer Reprints,* 29(2), Sept. 1988. This initiation results in new chains being initiated at various times during the polymerization and consequently results in a broadening of the polydispersity. Moreover, the processes of the aforementioned Otsu et al. reference are not believed to be applicable to the synthesis of narrow molecular weight distribution resins, particularly for polymers with high molecular weights.

The use of stable free radicals are known as inhibitors of free radical polymerizations, see for example, G. Moad et. al., *Polymer Bulletin* 6, 589 (1982). Studies by, for example, G. Moad et. al. *J. Macromol. Sci.-Chem.,* A17(1), 51(1982) have reported on the use of stable free radicals as inhibitors of free radical polymerizations performed at low temperatures, for example below 90° C. Wide polydispersities of between 2.0 and 2.4 are typical for a number of these type of processes for the free radical homopolymerizations of styrene. With copolymer systems, polydispersities of greater than 4 are generally obtained. The stable free radical polymerization processes of the present invention enable narrow polydispersities of between about 1.05 to about 2, and specifically about 1.1 to about 1.3 for polystyrene, and as low as 1.5 for various copolymer styrene acrylates. Also, the stable free radical polymerization systems of the present invention permit polydispersities that are comparable to those obtained in anionic polymerizations.

U.S. Pat. No. 4,581,429 discloses a free radical polymerization process which controls the growth of polymer chains to provide primarily short chain or oligomeric homopolymers and copolymers including block and graft copolymers. The process employs an initiator reaction product having the formula (in part)=N-O-X, where X is a free radical species capable of polymerizing unsaturated monomers. The molecular weights of the polymer products obtained are generally, for example, from about 2,500 to about 7,000 having polydispersities generally of about 1.4 to about 1.8, at low monomer to polymer conversion. The reactions typically have low conversion rates, use relatively low reaction temperatures of less than about 100° C., and use multiple stages. Reference to the working Examples of this patent indicate temperatures of less than 100° C., one $M_w/M_n$ ratio of apparently 1.15 (if the polymerization was allowed to continue similar to the other Examples it is believed that the polydispersity would probably broaden and be greater than 1.15), and wherein the $M_n$ was 3,200 and the conversion was low, 1.4 to 1.8, and wherein the calculated nonreported conversion rates are low, for example 22 percent or lower. With the aforementioned processes, it is believed that thermoplastic polymers were not obtained. In Example 23 where there was an attempt to increase the degree of polymerization up to n=70, the temperature was increased to 120° C. for 1.5 hours and there resulted a low molecular weight polymer of $M_n$=6,700 and a broad polydispersity of 1.82. In Example 25, there was employed additional heating at 140° C. for 2 hours to increase the degree of polymerization up to 22 which is still low and not in the region for the material to be considered a polymer. No molecular weight data was given in Example 25. Also in Example 29 the mixture was heated to 120° C. for 0.5 hour and n was only 11.

In U.S. Pat. No. 5,322,912, the disclosure of which is totally incorporated herein by reference, there is illustrated a free radical polymerization process for the preparation of a thermoplastic resin or resins comprising:

heating a mixture of a free radical initiator, a stable free radical agent, and at least one polymerizable monomer compound to form the thermoplastic resin or resins with a high monomer to polymer conversion;

cooling the mixture;

isolating the thermoplastic resin or resins; and washing and drying the thermoplastic resin or resins; and more specifically, a free radical polymerization process for the preparation of a thermoplastic resin or thermoplastic resins comprising:

heating at a temperature of at least 100° C., and in embodiments from about 120 to about 160° C., a mixture of a free radical initiator, a stable free radical agent, and at least one polymerizable monomer to form the thermoplastic resin or thermoplastic resins with a high monomer to resin or resins conversion of at least about 50 percent and with polydispersity of from about 1.05 to about 1.95;

cooling the mixture.

U.S. Pat. No. 5,059,657 discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 5,312,871 discloses a radical polymerization process for the preparation of narrow molecular weight distribution polymers which involves polymerizing a vinyl monomer or monomers with an initiator or initiating system comprising an alkyl or aryl metal, a strongly binding monodentate, bidentate or polydentate ligand and a stable oxy free radical. The initiating system of U.S. Pat. No. 5,312,871 is very complex, consisting of three components; an alkyl or aryl metal and a binding ligand (monodentate, bidentate or polydentate material), plus the stable oxy free radical. Examples of the alkyl or aryl metal are triisobutyl aluminum, diisobutyl aluminum hydride, dichloro ethyl aluminum, diethyl zinc, butyl lithium and phenyl magnesium bromide. Examples of the binding ligands are triphenylphosphine, bipyridyl, dimethylglyoxime and porphyrin. Examples of stable oxy free radical are TEMPO and galvinoxyl. The polymerization process is typically performed in a solvent media such as benzene, toluene or hexane at temperatures in the range of 0° C. to 100° C.

In the *Canadian Journal Of Chemistry,* Volume 47, pages 4049 to 4058, 1969, there is illustrated the mechanism for the initiation for the thermal polymerization of styrene.

SUMMARY OF THE INVENTION

Examples of objects of the present invention include:

An object of the present invention is to provide processes and polymers that overcome many of the problems and disadvantages of the prior art.

Another object of the present invention relates to the provision of processes for the suppression of thermally generated radicals by the use of certain bases.

Another object of the present invention is to provide a free radical polymerization reaction system which affords narrow polydispersity homopolymeric or copolymeric thermoplastic resin products, and wherein a base is selected.

Another object of the present invention is to provide a free radical polymerization reaction system which affords narrow polydispersity homopolymeric or copolymeric thermoplastic resin products with ultrasonic energy wherein the rate of polymerization is increased so that the required time to polymerize the monomer to polymer is diminished.

In another object of the present invention there is provided the acceleration of the dissociation of the free radical peroxide initiator by the addition of promoter compounds which include, for example, tertiary amines, which ensure that all polymeric chains are initiated nearly simultaneously or about the same time, and wherein low temperatures can be selected.

Another object of the present invention is to prepare resins using polymerization processes wherein the molecular weight of the growing homopolymer or copolymer chains increase over the entire time period of the polymerization reaction, and wherein the percent conversion or degree of polymerization of monomer to polymer with respect to time or number average molecular weight is approximately linear, that is, polymerization processes which occur without the aforementioned Trommsdorff effect.

The present invention in embodiments relates to processes for the preparation of resins, or polymers, such as thermoplastic resins, with a $M_w/M_n$ ratio of from about 1.05 to about 1.95, and preferably from about 1.1 to about 1.6, and wherein a high conversion of monomer to polymer is enabled, for example at least 50 percent and from about 50 to about 100, or 50 to 95 percent. More specifically, the present invention in embodiments relates to stable free radical polymerization processes for obtaining homopolymers, such as homopolymers of styrene, random copolymers, block copolymers, multiblock copolymers, and the like, such as specifically styrene acrylates, styrene methacrylates, styrene butadienes, and generally A, AA, AB, BA, AAA, ABA, BAB, AABBAB, ABC, homopolymers and copolymers by a stable free radical polymerization method, and wherein a base, especially an inorganic base, is selected, such as inorganic bases like alkali metal hydroxides of, for example, cesium hydroxide, potassium hydroxide, sodium hydroxide, sodium carbonate, potassium carbonate, cesium carbonate, and the like, or organic bases, such as alkylamines, like for example, triethylamine, tributylamine or alkoxyamines, as for example tetraethylammonium hydroxide, or benzylamines like, for example, benzyltriethylammonium hydroxide and the like.

The processes of the present invention comprise a free radical polymerization process comprising heating at an effective temperature, a mixture of a free radical initiator, a stable free radical agent, an inorganic base, and at least one polymerizable monomer compound to form thermoplastic resin or resins with a high monomer to polymer conversion; cooling the mixture; optionally isolating the thermoplastic resin or resins; and optionally washing and drying the thermoplastic resin or resins, and wherein the thermoplastic resin or resins possess a narrow polydispersity of, for example, from about 1.05 to about 1.95, and preferably from about 1.1 to about 1.6. At least one refers, for example, to one, from 1 to about 5, or from 1 to about 2. Use of the bases enables hydrolytic stability, thus the thermal inhibition of styrenics can be accomplished in the presence of water and no, or minimal precautions are needed to eliminate water from the monomer or during the polymerization process. Further, using bases, especially inorganic bases, during the SFRP process of styrenic monomers results in narrower polydispersity because no polymers are formed from the thermal initiation process, which results in dead polymers of broad polydispersity.

Embodiments of the present invention are directed to a free radical polymerization process for the preparation of thermoplastic resins comprising heating a first mixture comprised of a free radical initiator, a base component, a stable free radical agent, and polymerizable monomer compound to form a first intermediate product resin; optionally cooling the first mixture; adding to the first intermediate product resin a second mixture comprised of a free radical initiator, a stable free radical agent, and polymerizable monomer compound, wherein the polymerizable monomer or monomers of the second mixture is the same as, or similar to the polymerizable monomer or monomers of the first mixture, and the free radical initiator and the stable free radical agent of the second mixture are the same as or different from the free radical initiator and the stable free radical agent of the first mixture, to form a combined mixture; heating the combined mixture at low temperature and in the optional presence of ultrasonic energy to form a third mixture comprised of a mixture of thermoplastic resins comprised of a first product resin formed from the first intermediate product resin and added second monomer or monomers, and a second product resin formed from the second monomer or monomers; cooling the third mixture; optionally isolating the mixture of thermoplastic product resins from the third mixture; and optionally washing and drying the mixture of thermoplastic resins, and wherein the first product resin and the second product resin each possess a narrow polydispersity, and the mixture of thermoplastic resins possesses a modality equal to about 1 to about 2. Higher modalities, for example, of from about 2 to about 20 may be conveniently achieved if desired by the subsequent addition of effective amounts of fresh, or new mixtures of monomer or monomers, free radical initiator and stable free radical agent prior to a final cooling and isolation step.

Further, in embodiments of the present invention there is provided a free radical polymerization process for the preparation of a block copolymer thermoplastic resin or resins comprising heating at a temperature of from about 100 to about 160° C. a first mixture comprised of a free radical initiator, a stable free radical agent, a base, and at least one polymerizable monomer compound to form a first intermediate product resin; cooling the first mixture; isolating the first intermediate product resin; adding to the first intermediate product resin a second mixture comprised of at least one (when preparing a block copolymer there is usually added one monomer at a time, followed by polymerization, then the addition of the next monomer; thus the number of steps or times different monomers can be added is numerous, but each time only one monomer is added) polymerizable monomer compound, wherein the polymerizable monomer compound of the second mixture is different from the polymerizable monomer compound of the first mixture to form a combined mixture. The isolation of the intermediate product resin is preferred when highest purity and block integrity or homogeneity is desired, that is, residual unreacted monomer or monomers of the first mixture may subsequently react with and be integrated into the growing polymer chain formed from the second mixture of polymerizable monomer compounds. Thus, in preparing block copolymers isolation by, for example, precipitation of intermediate products of the polymerization reaction is preferred when, for example, high purity is desired or when the degree of polymerization is less than about 70 to 90 percent for a block or multiblock polymerization reaction. The thermoplastic resins formed possess, for example, a narrow polydispersity of about 1.1 to about 1.6 and in embodiments a modality of 1.

The present invention includes the following embodiments:

a free radical polymerization process for the preparation of thermoplastic resin comprising heating a mixture of a base, such as cesium hydroxide, a free radial initiator, such as benzoyl peroxide, a stable free radical agent, and at least one polymerizable monomer compound, and wherein said heating is accomplished at a temperature of from about 100 to about 140° C.;

cooling the mixture; and isolating said thermoplastic resin, and washing and drying the thermoplastic resin;

a free radical polymerization process for the preparation of a thermoplastic resin or thermoplastic resins comprising:

heating a mixture of a free radical initiator, a stable free radical agent, a base, and at least one polymerizable monomer to form said thermoplastic resin or thermoplastic resins with a high monomer to resin or resins conversion of at least about 50 percent, and which resin or resins possess an excellent polydispersity of from about 1.05 to about 1.95, wherein said heating is accomplished at a temperature of from about 100 to about 160° C., and cooling the mixture;

a free radical polymerization process for the preparation of thermoplastic resin comprising:

heating a first mixture comprised of a free radical initiator, a base, a stable free radical agent, and at least one polymerizable monomer compound to form a first intermediate product resin;

optionally cooling the first mixture;

adding to the resulting first intermediate product resin a second mixture comprised of a free radical initiator, a base, a stable free radical agent, and at least one polymerizable monomer compound, wherein said polymerizable monomer compound of said second mixture contains the same components as said polymerizable monomer compound of said first mixture, and said free radical initiator and said stable free radical agent of said second mixture are the same as or different from said free radical initiator and said stable free radical agent of said first mixture, and wherein there is formed a combined mixture;

heating said combined mixture to form a third mixture comprised of a mixture of thermoplastic resins comprised of a first product resin formed from said first intermediate product resin and added said second monomer and a second product resin formed from said second monomer;

cooling said third mixture;

and wherein said first product resin and said second product resin each possess a narrow polydispersity of from about 1.05 to about 1.95; processes for obtaining polymers with a weight average molecular weight ($M_w$) to the number average molecular weight ($M_n$) of from about 1.0 to about 2.0 and preferably from about 1.1 to about 1.6, and wherein in embodiments there can be selected as the stable free radical agent 4-oxo-2,2,6,6-tetramethyl-1-piperidinyloxy, (4-oxo-TEMPO).

In embodiments of the aforementioned processes, polymer or copolymer resin compositions are obtained wherein the product resin or resins has a weight average molecular weight ($M_W$) of from about 2,000 to about 400,000 and a number average molecular weight ($M_n$) of from about 1,800 to about 225,000, and a polydispersity of about 1.05 to about 1.95, and more specifically, wherein the $M_w/M_n$ is from about 1.1 to about 1.6, from about 1.1 to about 1.5, or from about slightly greater than 1 to about 1.6.

Propagating chains are referred to as pseudoliving primarily because the stable free radical agent adds to a propagating chain and the chain is temporarily, but reversibly, terminated, and more specifically, the propagating polymer chain fluctuates or is in an equilibrium condition between being temporarily terminated or suspended, and being alive or living. As thermal energy is supplied from the reaction system to the bond joining the growing polymeric chain and the stable free radical is covalently bound to the propagating chain, for example, a substituted styrene, homolytically cleaves thereby temporarily generating a living chain end radical species permitting another monomer unit or units to insert or add to the chain and is again instantaneously, albeit short lived as determined by diffusion control, terminated or protected by the stable free radical agent as a thermally labile adduct. Protected refers, for example, to the chain radical species, that is available for selective rather than indiscriminate further reaction with monomer. An unmoderated free radical polymerization chain, that is a free radical polymerization process without a stable free radical agent present, in contrast has a reactive or open chain end throughout its lifetime.

Processes of the present invention further comprises, as indicated herein, a method for sequentially repeating the monomer addition or polymerization step, and with additional stable free radical and free radical initiator of the process being added, N times, to provide a well defined mixture of thermoplastic resins wherein each resin in the mixture is comprised of polymers having discrete and narrow polydispersities, and wherein the mixture has a modality equal to N+1 wherein N is the number of times the addition step of initiator, stable free radical agent and monomer is repeated.

Also, included within the scope of the present invention is a process for the preparation of polymer comprising heating a mixture comprised of a free radical initiator, a stable free radical agent, a base selected from the group consisting of inorganic bases and organic bases, and at least one polymerizable monomer compound and optionally, but preferably, cooling, followed by optionally, but preferably, isolating the polymer product; a process wherein the heating is accomplished at a temperature of from about 100° C. to about 160° C., cooling and isolating is accomplished, and at least one is one; a process wherein the base is cesium hydroxide; a process wherein the inorganic base is selected from the group consisting of potassium hydroxide, sodium hydroxide, sodium carbonate, potassium carbonate, and cesium carbonate, and wherein the organic base is selected from the group consisting of triethylamine, tetraalkylammonium hydroxides, tetraarylammonium hyroxides, phenol and substituted phenols, and which base is optionally selected in an amount of from about 0.0002 to about 0.02 mole, or from about 0.001 to about 0.005 mole of base per mole of polymer, and which polymer is styrene; a free radical polymerization process wherein the polymer product possesses a narrow polydispersity and is obtained in a conversion of from about 30 to about 95 percent, and which polydispersity is from about 1.1 to about 1.8; a process wherein the heating is conducted with a monomer suspension in water or as a monomer suspension in a polar liquid which is not miscible with the monomer compound; a process wherein the polymer product has a polydispersity of from about 1.05 to about 1.95; a process wherein the heating is accomplished for a period of time of from about 10 minutes to about 20 hours; a process wherein said free radical initiator is selected from the group consisting of organic peroxides, azobisalkylnitriles, peroxycarbonates, and mixtures thereof, and wherein as the stable free radical agent there is optionally selected an oligomeric polymer macroinitiator that is terminated with nitroxide; a process wherein the stable free radical agent is a nitroxide stable free radical; a process wherein the stable free radical agent is a nitroxide stable free radical selected from the group consisting of 2,2,5,5-tetramethyl-1-pyrrolidinyloxy and derivatives thereof, 2,2,6,6-tetramethyl-1-piperidinyloxy and derivatives thereof, 4,4-dimethyl-1-oxazolidinyloxy and derivatives thereof, N,N-dialkyl nitroxides and derivatives thereof, and mixtures thereof; a process wherein the stable free radical agent to free radical initiator molar ratio is from about 0.5:1 to about 20:1, or wherein the stable free radical agent to free radical initiator molar ratio is from about 1:1 to about 5:1, wherein the monomer to free radical initiator molar ratio is from about 10:1 to about 10,000:1, and wherein said monomer to polymer conversion is from about 30 to about 95 percent and the polydispersity of the polymer obtained is from about 1.1 to about 1.6 and wherein from one to three monomers are selected; a process wherein the monomer is a styrene, or an acrylate; a process wherein the molar ratio of monomer to stable free radical agent to free radical initiator is from about 10:0.5:1 to about 10,000:5:1 or from about 300:1.3:1 to about 7,000:1.3:1; a process wherein the stable free radical agent is 4-oxo-2,2,6,6-tetramethyl-1-piperidinyloxy, and the free radical initiator is azobisisobutyronitrile; a process wherein the free radical initiator is benzoyl peroxide; a process wherein the free radical initiator and the stable free radical are added as separate components; a process wherein one monomer is selected, or from one to about 5 monomers are selected; a process wherein the stable free radical agent is a nitroxide stable free radical selected from the group consisting of 2,2,5,5-tetramethyl-1-pyrrolidinyloxy, 2,2,6,6-tetramethyl-1-piperidinyloxy, 4,4-dimethyl-1-oxazolidinyloxy, or N,N-dialkyl nitroxides; or wherein the stable free radical agent is 2,2,6,6-tetramethyl-1-piperidinyloxy, and the free radical initiator is benzoyl peroxide; a process wherein the mixture is cooled to about 25° C., and wherein the polymer product is isolated by precipitation in a nonsolvent, followed by filtration; a process for the preparation of toner, which toner comprises a copolymer obtained by heating a first mixture comprised of a free radical initiator, a stable free radical agent, a base, and a polymerizable monomer compound to form a first intermediate product resin;

cooling said intermediate product resin first mixture;

isolating said first intermediate product resin;

adding to said first intermediate product resin a second mixture comprised of a polymerizable monomer compound, wherein said polymerizable monomer compound of said second mixture is different from said polymerizable monomer compound of said first mixture, and wherein there is formed a combined mixture;

heating said combined mixture to form a third mixture comprised of a copolymer thermoplastic resin comprised of a first product resin formed from said first intermediate product resin and added said second monomer;

cooling said third mixture;

isolating said copolymer thermoplastic resin from said third mixture; and optionally washing and drying said copolymer thermoplastic polymer, and subsequently mixing the polymer obtained with colorant; and a process for the preparation of developer comprising mixing a toner with carrier particles, and wherein the base is an inorganic base; a process wherein the copolymer resin is prepared by heating a first mixture comprised of a free radical initiator, a stable free radical agent, an inorganic base, and a polymerizable monomer compound and optionally cooling, followed by isolating the intermediate resin product;

adding to the first intermediate product resin a second mixture comprised of at least one polymerizable monomer compound, wherein said polymerizable monomer compound of the second mixture is different from said polymerizable monomer compound of the first mixture, and wherein there is formed a combined mixture;

heating the combined mixture to form a third mixture comprised of a copolymer thermoplastic resin comprised of a first product resin formed from the first intermediate product resin and added the second monomer;

cooling the third mixture;

isolating the block copolymer thermoplastic resin from the third mixture; and optionally washing and drying said copolymer thermoplastic resin, and wherein said heating is accomplished at a temperature of from about 100 to about 160° C.; a free radical polymerization process for the preparation of a multiblock copolymer thermoplastic resin or resins wherein there is added to the first intermediate product resin a second mixture comprised of at least one polymerizable monomer compound, wherein the polymerizable monomer compound of said second mixture is dissimilar than said polymerizable monomer compound of said first mixture, to form a combined mixture; heating said combined mixture to form a third mixture comprised of a block copolymer thermoplastic resin comprised of a first product resin formed from said first intermediate product resin and added said second monomer;

cooling the third mixture;

optionally isolating the third mixture;

sequentially repeating the preceding steps of adding, heating and cooling, N times, to form a fourth mixture containing a multiblock copolymer thermoplastic resin or resins having N+2 blocks, and wherein N is the number of times said sequence is repeated;

optionally isolating said multiblock copolymer thermoplastic resin from said fourth mixture; and optionally washing and drying said copolymer thermoplastic resin; and a process wherein the base is an inorganic base selected from the group consisting of cesium hydroxide, potassium hydroxide, sodium hydroxide, sodium carbonate, potassium carbonate, cesium carbonate, or the base is an organic base of tertiary or quaternary amines of triarylamines, trialkylamines or arylalkylamines, as for example triethylamine, triisopropylamine, triphenylamine, or from groups such as alkoxyamines such as tetraalkylammonium hydroxides, tetraarylammonium hyroxides, as for example tetraethylammonium hydroxide or benzyltriethylammonium hydroxide; or bases from alkoxy salts, and which base is selected in an amount of from about 0.001 to about 0.005 moles of base per mole of styrene.

The reaction time may vary, for example about 1 to about 60 hours, preferably between about 2 to about 10 hours, and more preferably from about 4 to about 7 hours. The preferred reaction time may vary depending, for example, upon the temperature, the volume and scale of the reaction, and the quantity and type of polymerization initiator and stable free radical agent selected. The polymerization reaction temperature is retained relatively constant throughout the heating by providing an adjustable external heat source, and which temperature is maintained at, for example, from about 100° C. to about 160° C., and preferably from about 100° C. to about 140° C.

The free radical initiator selected can be any free radical polymerization initiator capable of initiating a free radical polymerization process and includes peroxide initiators, such as benzoyl peroxide and azo initiators, such as azobisisobutyronitrile, and the like with benzoyl peroxide being preferred. The initiator concentration employed can be any effective suitable amount, and is, for example, from about 0.2 to about 6 weight percent of the total weight of monomer to be polymerized and which concentration is determined by the desired molecular weight of the resin. As the initiator concentration is decreased relative to the weight of molar equivalents of monomer used, the molecular weight of the thermoplastic resin product increases. This free radical initiator can be added as a separate component to the reaction mixture, and is not reacted with the stable free radical agent prior to use thereof in embodiments of the processes illustrated herein.

Examples of stable free radical agents, or components that can be selected include nitroxide free radicals like, for example, proxyl(2,2,5,5-tetramethyl-1-pyrrolidinyloxy), 3-carboxyl-proxyl, 3-carbamoyl-proxyl, 2,2-dimethyl-4,5-cyclohexyl-proxyl, 3-oxo-proxyl, 3-hydroxylimine-proxyl, 3-aminomethyl-proxyl, 3-methoxy-proxyl, 3-t-butyl-proxyl, 3-maleimidoproxyl, 3,4-di-t-butyl-proxyl, 3-carboxylic-2,2,5,5-tetramethyl-1-pyrrolidinyloxy and the like, and derivatives thereof, and TEMPO (2,2,6,6-tetramethyl-1-piperidinyloxy), 4-benzoxyloxy-TEMPO, 4-methoxy-TEMPO, 4-carboxylic-4-amino-TEMPO, 4-chloro-TEMPO, 4-hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl-1-piperidinyloxy and the like, and derivatives thereof, and dialkyl nitroxide radicals such as di-t-butyl nitroxide, diphenyl nitroxide, t-butyl-t-amyl nitroxide and the like, and derivatives thereof, and DOXYL (4,4-dimethyl-1-oxazolidinyloxy), 2-di-t-butyl-doxyl, 5-decane-doxyl, 2-cyclohexane-doxyl, and the like, and derivatives thereof, and 2,5-dimethyl-3,4-dicarboxylic-pyrrole, 2,5-dimethyl-3,4-diethylester-pyrrole, 2,3,4,5-tetraphenyl-pyrrole and the like, and 3-cyano-pyrroline-3-carbamoyl-pyrroline, 3-carboxylic-pyrroline and the like; 1,1,3,3-tetramethylisoindolin-2-yloxyl and 1,1,3,3-tetraethylisoindolin-2-yloxyl and the like; porphyrexide nitroxyl radicals, such as 5-cyclohexyl porphyrexide nitroxyl and 2,2,4,5,5-pentamethyl-· SYMBOL 68 "Symbol" ·__·3-imidazoline-3-oxide-1-oxyl and the like, and galvinoxyl and the like; 1,3,3-trimethyl-2-azabicyclo[2,2,2] octane-5-one-2-oxide and 1-azabicyclo[3,3,1]nonane-2-oxide and the like; and with TEMPO being preferred. These stable free radical agent materials are known, reference for example a number of the patents recited herein, and G. Moad et al., *Tetrahedron Letters*, 22, 1165 (1981) as free radical polymerization inhibitors. However, under the polymerization conditions of the present invention the stable free radical agents function primarily as moderators to harness the normally highly reactive and indiscriminate intermediate free radical species. Also, the nitroxides include N,N-disubstituted nitroxides such as Fremy's salt.

The molar ratio of the stable free radical (SFR) agent to free radical initiator (INIT) is from about 2.5 to 0.5, and preferably in the range from about 2.0 to 0.9. Although not desired to be limited by theory, in embodiments, the molar ratio [SFR:INIT] of stable free radical agent, for example TEMPO, to free radical initiator, for example benzoyl peroxide, of about 1.3 to 1 is believed to be important. In embodiments, when the [SFR:INIT] is too high then the reaction rate can be decreased. When the [SFR:INIT] is too low, then the reaction product may have undesired increased polydispersity. Also, when styrene is polymerized to polystyrene without the stable free radical agent of the instant process the product polymers isolated have polydispersities of 2.0 and above.

In embodiments, the molar ratio of monomer content to stable free radical agent to free radical initiator is from about 10:0.5:1 to about 10,000:5:1 and preferably in the range of about 300:1.3:1 to about 7,000:1.3:1. Of importance in embodiments, especially with regard to the polymerization of styrene, is a molar ratio of stable free radical to initiator of from about 1.3 to about 1. For monomers other than styrenes, such as acrylates, similar ratios are selected, that is 1.3:1.

Examples of inorganic bases selected include cesium hydroxide, potassium hydroxide, sodium hydroxide, sodium carbonate, potassium carbonate, cesium carbonate, and the like. Examples of organic bases include triethylamine, tetraethylammonium hydroxide and benzyltriethylammonium hydroxide, and the like. The amount of base is primarily dependent on the reaction time. Thus, the amount of base selected is, for example, from about $3.4 \times 10^{-5}$ moles of base per mole of monomer per hour of reaction to about $3.4 \times 10^{3}$ moles of base per mole of monomer per hour of reaction and preferably about $3.4 \times 10^{-4}$ moles of base per mole of monomer per hour of reaction. The primary function of the base is to prevent thermal polymerization of monomers, especially styrenic monomers thus enabling, for example, the preparation of low polydispersed (<1.4) polystyrenics or random copolymers of high molecular weight of from about 130,000 to about 400,000. In the absence of bases, thermal polymerization occurs primarily because thermally initiated radicals form at the rate of about $3.4 \times 10^{-4}$ moles of radicals per mole of styrenic monomer per hour of reaction time at 135° C. When low molecular weight polystyrene of between 5,000 and 100,000 is prepared by known SFRP process, there is sufficient free nitroxide, which is usually always present, to react with the thermally initiated radicals to prevent thermal polymerization. When high molecular weight polystyrene of 150,000 to 500,000 is prepared by SFRP process, 5 to 10 times less free nitroxide is present, primarily because 5 to 10 times less initiator is required. Thus, when thermally generated radicals form, there is not enough free nitroxide to capture all of these radicals and conventional thermal polymerization occurs, which causes a significant broadening of the polydispersity, for example from 1.6 to 2.2.

Processes of the present invention in embodiments provide for high monomer to polymer conversion rates, or degrees of polymerization, for is example of 90 percent by weight or greater and, more specifically, from about 75 to about 100 percent in embodiments. Further, the processes of the present invention in embodiments provide for relatively high weight average molecular weights of the polymer product, from weight average molecular weights ranging from about 2,000 to about 400,000 and preferred ranges of from about 2,000 to about 250,000. In embodiments with the process of the present invention, polymers with Mw of about 500,000 can be obtained.

The monomers selected include those capable of undergoing a free radical polymerization, and include, but are not limited to styrene, substituted styrenes and derivatives thereof, for example methylstyrene, 4-methylstyrene, butadiene and any conjugated diene monomer sufficiently reactive under the specified stable free radical moderated polymerization reaction conditions to afford a stable free radical reaction adduct and high molecular weight polymer product, for example isoprene and myrcene, acrylates, and derivatives thereof.

Examples of polymers obtained include styrenes, acrylates, styrene acrylates, styrene butadienes, and the like. The polymerization, especially the acrylate polymerization of the present invention, can in embodiments be supplemented with a solvent or cosolvent to help ensure that the reaction mixture remains a homogeneous single phase throughout the monomer conversion. Any solvent or cosolvent may be selected providing, for example, that the solvent media is effective in permitting a solvent system which avoids precipitation or phase separation of the reactants or polymer products until after all polymerization reactions have been completed. Exemplary solvents or cosolvents include polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives, such as butyl CARBITOL® or CELLOSOLVE®, amino alcohols, ketones, and the like, derivatives thereof, and mixtures thereof. Specific solvent examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

The polymerization reaction rate of the monomers may in embodiments be accelerated and the reaction time reduced to, for example, about 4 to about 7 hours from greater than 16 hours by the addition of a catalytic amount of a protic acid that will not also initiate cationic polymerization, and which acid is selected from the group consisting of organic acids such as sulfonic, phosphoric, carboxylic acids and nitroxides containing acid functional groups, such as 3-carboxyl-proxyl, and wherein camphor sulfonic acid is a preferred acid. The molar ratio of stable free radical to acid can vary and, for example, can be from about 100:1 to 1:1 with a preferred ratio of between about 20:1 and 5:1. Excessive addition of organic acid beyond the aforementioned amounts may in embodiments cause the resin polydispersity to broaden. After addition of the acid and within a short time period, for example from about 5 to about 20 minutes after the reaction is initiated, the base can then be added. During this period less than about $3.4 \times 10^{-4}$ moles of thermally initiated radicals will form, and the excess nitroxide is still reduced by the reaction with the acid.

The stable free radical moderated polymerization process of the present invention may be repeated a number of times within the same reaction vessel by the delayed and stepwise addition of more monomer or monomers with varying amounts of initiator and stable free radical agent to form a mixture of monomodal resins where each component has a distinct molecular weight and has a narrow molecular weight distribution, and wherein the mixture has a modality of N+1, where N represents the number of additional times that monomer, initiator and stable free radical agent are added.

By cooling, which can be accomplished by terminating the heating source, such as an oil bath, and removing the vessel from the oil bath and permitting it to cool on its own while maintaining stirring, the polymerization reaction attains ambient temperature and the stable free radical moderated reaction is effectively quenched or terminated. Each new or subsequent addition of monomer, stable free radical and initiator accompanied by heating with ultrasound provides a new polymeric species having a narrow molecular weight distribution, and each new polymer species continues to grow independent of the other polymer species previously formed.

Alternatively, block copolymer resins may also be prepared whereby after each desired block has been formed a new monomer or monomers is added without the addition of more initiator or stable free radical agent to form a new block wherein each block component is well defined in length and has a narrow molecular weight distribution, and having properties depending on the repeated sequence and the monomers chosen for incorporation.

Additional optional known additives may be selected in the polymerization reactions, and which may provide additional performance enhancements to the resulting product, for example colorants, lubricants, release or transfer agents, surfactants, stabilizers, antifoams, and the like.

Polymer resins possessing discrete mixture of monomodal, that is a well defined multimodal molecular weight distribution, may in embodiments thereof provide several advantages, particularly for electrophotographic toner compositions, such as melt rheology properties including improved flow and elasticity; and improved performance properties such as triboelectrification, admix rates and shelf life stabilities.

The processes of the present invention can be selected to form a wide variety of polymers. For example, it can be used to polymerize a styrene monomer to form polystyrene, butadiene to form polybutadiene or n-butyl acrylate to form poly(n-butyl acrylate). The process of the present invention can be selected to polymerize a mixture of two or more different polymerizable monomers to form copolymers therefrom, for example polymerization of styrene and butadiene to form poly(styrene-butadiene), styrene and isoprene to form poly(styrene-isoprene), styrene and ethyl acrylate to form poly(styrene-ethylacrylate), and the like, and combinations thereof, including copolymers and terpolymers.

A suitable reaction medium employed for conducting processes of the instant invention includes bulk or neat, suspension, emulsion, and solution systems.

In embodiments, there can be incorporated into the monomer a waxy component, such as alkylenes like polyethylene, polypropylene waxes, and mixtures thereof, having a low molecular weight of from between about 1,000 to about 20,000. The use of such a component may be desirable for certain toner applications. Suitable low molecular weight waxes, such as polyethylene and polypropylene, are disclosed in U.S. Pat. No. 4,659,641, the disclosure of which is totally incorporated herein by reference.

Toner compositions can be prepared by a number of known methods, such as admixing and heating the polymer or resin obtained with the processes of the present invention, such as styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably from about 6 to about 12 microns, which diameters are determined by a Coulter Counter. Thereafter, the toner compositions can be classified utilizing, for example, a Donaldson Model B classifier for the purpose of removing toner fines, that is toner particles less than about 4 microns volume median diameter.

Illustrative examples of suitable toner resins obtained with the processes of the present invention that can be selected for toner and developer compositions include styrene acrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, 2-ethylhexyl acrylate, n-octyl acrylate, phenyl acrylate, acrylonitrile, methacrylonitrile, acrylamide, and the like. Preferred toner resins include styrene butadiene copolymers, mixtures thereof, and the like. Other preferred toner resins include styrene/acrylate copolymers, PLIOLITES®, and suspension polymerized styrene butadienes, reference U.S. Pat. No. 4,558,108, the disclosure of which is totally incorporated herein by reference.

In toner compositions, the resin particles are present in a sufficient but effective amount, for example from about 60 to about 90 weight percent. Thus, when 1 percent by weight of a charge enhancing additive is present, and 8 percent by weight of pigment or colorant, such as carbon black, is contained therein, about 91 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

There can also be blended with the toner compositions of the present invention external additive particles including flow aid additives, which additives are usually present on the surface thereof. Examples of these additives include fumed silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, fumed silicas, such as AEROSIL®, can be surface treated with the charge additives in an amount of from about 1 to about 30 weight percent and preferably 10 weight percent, followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight, and may in embodiments function as fuser roll release agents.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxysilane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

The diameter of the carrier particles, preferably spherical in shape, is generally from about 50 microns to about 1,000 microns, and in embodiments about 70 to about 175 microns thereby permitting them to possess sufficient density and inertia to avoid adherence to the electrostatic images during the development process. The carrier component can be mixed with the toner composition in various suitable combinations, however, best results are obtained when about 1 to about 5 parts per toner to about 10 parts to about 200 parts by weight of carrier are selected.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Flexible layered imaging members with charge transport and photogenerating layers can be selected for the imaging and printing processes.

The following Examples are being provided to further define various species of the present invention, it being noted that these Examples are intended to illustrate and not limit the scope of the present invention. Parts and percentages are by weight unless otherwise indicated. Comparative Examples and data are also provided.

COMPARATIVE EXAMPLE 1

(BK24782-72e) Styrene Only—No Inhibitors—Control:

To a 100 milliliter round bottomed flask equipped with a mechanical stirrer, gas inlet and water condenser under an argon atmosphere was discharged styrene (20 milliliters, 0.175 mol). The styrene was then heated at an oil bath temperature of 135° C. for 1.5 hours. Sampling of the reaction solution by taking 0.1 gram at 20 minutes, 45 minutes and 90 minutes indicated polymerization, and the conversion as measured by TGA was 11.5 percent, 35 percent and 65 percent, respectively.

COMPARATIVE EXAMPLE 2

(BK24782-76a) Styrene With CSA—Control:

To a 100 milliliter round bottomed flask equipped with a mechanical stirrer, gas inlet and water condenser under an argon atmosphere was discharged styrene (20 milliliters, 0.175 mol) and camphorsulfonic acid (0.087 gram, 0.374 millimoles). The mixture was then heated at an oil bath temperature of 135° C. for 100 minutes. Sampling of the reaction solution by taking 0.1 gram at 20 minutes and 100 minutes showed polymerization, and the conversion as measured by TGA was 4.8 percent and 13.8 percent, respectively,

EXAMPLE III (BK24782-58b) Styrene with CsOH:

To a 100 milliliter round bottomed flask equipped with a mechanical stirrer, gas inlet and water condenser under an argon atmosphere was discharged styrene (20 milliliters, 0.175 mol) and cesium hydroxide (0.3 milliliter of a 50 percent w/w in water). This mixture was then heated at an oil bath temperature of 135° C. for six hours. Sampling of the reaction solution by selecting 0.1 gram every hour showed no polymer was formed, and analysis of the sample by TGA showed only styrene monomer present.

EXAMPLE IV (BK24782-76a) Styrene with Benzyltriethylammoniumhydroxide:

To a 100 milliliter round bottomed flask equipped with a mechanical stirrer, gas inlet and water condenser under an argon atmosphere was discharged styrene (20 milliliters, 0.175 mol), n-methylpyrrolidinone (5 milliliters), and benzyltriethylammonium hydroxide (0.1 milliliter, of 35 w/w solution in methanol). The mixture was then heated at an oil bath temperature of 135° C. for 210 minutes. Sampling of the reaction solution, by taking 0.1 gram, at 90 minutes and 210 minutes indicated a small, or low amount of polymerization, and the conversion as measured by TGA was 5 percent and 27 percent, respectively.

COMPARATIVE EXAMPLE 5

(BK27307-86a) Control at 140° C. from Macroinitiator:

To a 100 milliliter round bottomed flask equipped with a mechanical stirrer, gas inlet and water condenser was discharged polystyrene-TEMPO terminated (0.1 gram, $M_n$=15,870, $6.3 \times 10^{-6}$ moles) and styrene (45 milliliters, 0.393 mol). This solution was then heated by immersion into a preheated oil bath of 140° C. The reaction was stirred for 3 hours. The solution was then cooled to room temperature and precipitated from 500 milliliters of methanol. The number average molecular weight, as determined by gel permeation chromatography, of polystyrene product was 151,544 with a polydispersity of 1.64.

COMPARATIVE EXAMPLE 6

(BK27482-64a) Control at 135° C. from Initiator:

To a 100 milliliter round bottomed flask equipped with a mechanical stirrer, gas inlet and water condenser was discharged styrene (25 milliliters, 0.218 mol), benzoylperoxide (BPO, 0.02239 gram, 0.0000998 mol) and 4-hydroxy TEMPO (0.0226 gram, 0.0000131 mol). This solution was then heated by immersion into a preheated oil bath of 135° C. This solution was stirred for 3.5 hours. The solution was then cooled and precipitated from 200 milliliters of methanol. After drying, 33 grams (61 percent conversion) of polystyrene were obtained. The number average molecular weight was 89,802 with polydispersity of 1.67.

EXAMPLE VII (BK24366-36B):

To a 100 milliliter round bottomed flask equipped with a mechanical stirrer, gas inlet and water condenser was discharged styrene (60 milliliters, 0.521 mol), 18-crown-6 ether (used to solubilize cesium hydroxide in styrene, 0.36 gram, 0.00126 mol), benzoylperoxide (BPO, 0.8 gram, 0.00356 mol) and TEMPO (0.556 gram, 0.00356 mol). This solution was then heated by immersion into a preheated oil bath of 135° C. After 10 minutes at this temperature, cesium hydroxide (0.3 milliliter of a 50 percent w/w aqueous solution, 0.00173 mol) was added and continued to stir for 8 hours. The solution was then cooled and precipitated from 500 milliliters of methanol. After drying, 21.9 grams (40 percent conversion) of polystyrene were obtained. The number average molecular weight of polystyrene product was 8,738 with polydispersity of 1.20.

EXAMPLE VIII (BK24366-46):

To a 250 milliliter round bottomed Morton flask equipped with a mechanical stirrer, gas inlet and water condenser was discharged styrene (60 milliliters, 0.521 mol), N-methylpyrrolidinone (5 milliliters, used instead of 18-crown-6), polystyrene-acetimido TEMPO terminated (1 gram of a $M_n$=9318, 0.000107 mol) and cesium hydroxide (0.3 milliliter of a 50 percent w/w aqueous solution, 0.00173 mol). The solution was deoxygenated by bubbling argon through it for 20 minutes and then heating the solution by immersion into a preheated oil bath of 145° C. and stirring for 4 hours. Conversion was determined by TGA to be 30 percent and resulted in a number average molecular weight of polystyrene of 178,543 with a polydispersity of 1.46.

Other modifications of the present invention may occur to one of ordinary skill in the art subsequent to a review of the present application, and these modifications, including equivalents thereof, are intended to be included within the scope of the present invention.

What is claimed is:

1. A process for the preparation of a polymer comprising heating a mixture comprised of a free radical initiator, a stable free radical agent, an inorganic base and at least one polymerizable monomer compound and optionally cooling, followed by optionally isolating the polymer product, and wherein said base functions to prevent or minimize thermal polymerization of said monomer.

2. A process in accordance with claim 1 wherein the heating is accomplished at a temperature of from about 100° C. to about 160° C., cooling and isolating is accomplished, and at least one is one.

3. A process in accordance with claim 1 wherein the base is cesium hydroxide.

4. A process in accordance with claim 1 wherein the inorganic base is selected from the group consisting of potassium hydroxide, sodium hydroxide, sodium carbonate, potassium carbonate, and cesium carbonate, and which base is optionally selected in an amount of from about 0.0002 to about 0.02 mole, or from about 0.001 to about 0.005 mole of base per mole of polymer, and which polymer is styrene.

5. A free radical polymerization process in accordance with claim 1 wherein the polymer product possesses a narrow polydispersity and is obtained in a conversion of from about 30 to about 95 percent, and which polydispersity is from about 1.1 to about 1.8.

6. A process in accordance with claim 1 wherein the heating is conducted with a monomer suspension in water or as a monomer suspension in a polar liquid which is not miscible with said monomer compound.

7. A process in accordance with claim 1 wherein the polymer product has a polydispersity of from about 1.05 to about 1.95.

8. A process in accordance with claim 1 wherein the heating is accomplished for a period of time of from about 10 minutes to about 20 hours.

9. A process in accordance with claim 1 wherein said free radical initiator is selected from the group consisting of organic peroxides, azobisalkylnitriles, peroxycarbonates, and mixtures thereof, and wherein as the stable free radical agent there is optionally selected an oligomeric polymer macroinitiator that is terminated with nitroxide.

10. A process in accordance with claim 1 wherein the stable free radical agent is a nitroxide stable free radical.

11. A process in accordance with claim 1 wherein the stable free radical agent is a nitroxide stable free radical selected from the group consisting of 2,2,5,5-tetramethyl-1-pyrrolidinyloxy 2,2,6,6-tetramethyl-1-piperidinyloxy, 4,4-dimethyl-1-oxazolidinyloxy, and mixtures thereof. N,N-dialkyl nitroxides.

12. A process in accordance with claim 1 wherein the stable free radical agent to free radical initiator molar ratio is from about 0.5:1 to about 20:1, or wherein the stable free radical agent to free radical initiator molar ratio is from about 1:1 to about 5:1, wherein the monomer to free radical initiator molar ratio is from about 10:1 to about 10,000:1, and wherein said monomer to polymer conversion is from about 30 to about 95 percent and the polydispersity of the polymer obtained is from about 1.1 to about 1.6 and wherein from one to three monomers are selected.

13. A process in accordance with claim 1 wherein the monomer is a styrene, or an acrylate.

14. A process in accordance with claim 1 wherein the molar ratio of monomer to stable free radical agent to free radical initiator is from about 10:0.5:1 to about 10,000:5:1 or from about 300:1.3:1 to about 7,000:1.3:1.

15. A process in accordance with claim 1 wherein the stable free radical agent is 4-oxo-2,2,6,6-tetramethyl-1-piperidinyloxy, and the free radical initiator is azobisisobutyronitrile.

16. A process in accordance with claim 1 wherein the free radical initiator is benzoyl peroxide.

17. A process in accordance with claim 1 wherein the free radical initiator and the stable free radical agent are added as separate components.

18. A process in accordance with claim 1 wherein one monomer is selected, or from one to about 5 monomers are selected.

19. A process in accordance with claim 3 wherein the stable free radical agent is a nitroxide stable free radical selected from the group consisting of 2,2,5,5-tetramethyl-1-pyrrolidinyloxy, 2,2,6,6-tetramethyl-1-piperidinyloxy, 4,4-dimethyl-1-oxazolidinyloxy, and N,N-dialkyl nitroxides.

20. A process in accordance with claim 1 wherein the mixture is cooled to about 25° C., and wherein the polymer product is isolated by precipitation in a nonsolvent, followed by filtration.

21. A process in accordance with claim 1 wherein the base is an inorganic base selected from the group consisting of cesium hydroxide, potassium hydroxide, sodium hydroxide, sodium carbonate, potassium carbonate, cesium carbonate, and which base is selected in an amount of from about 0.001 to about 0.005 moles of base per mole of styrene.

22. A process for the preparation of polymer comprising heating a mixture of a free radical initiator, a stable free radical agent, an inorganic base, and at least one polymerizable monomer compound and thereafter optionally cooling, followed by optionally isolating the polymer product.

23. A process in accordance with claim 22 wherein said inorganic base is selected from the group consisting of potassium hydroxide, sodium hydroxide, sodium carbonate, potassium carbonate, cesium carbonate and cesium hydroxide.

24. A process in accordance with claim 22 wherein said base is selected in an amount of from about 0.002 to about 0.02 mole of base per mole of polymer.

25. A process in accordance with claim 22 wherein said base is cesium hydroxide.

26. A process in accordance with claim 22 wherein said heating is accomplished at a temperature of from about 100° C. to about 160° C., followed by cooling, and wherein isolation is accomplished to result in said polymer product.

\* \* \* \* \*